United States Patent [19]

Groves

[11] 4,006,931
[45] Feb. 8, 1977

[54] DEVICE FOR REDUCING WIND RESISTANCE OF A VEHICLE

[75] Inventor: Donald W. Groves, Birmingham, Mich.

[73] Assignee: Ford Motor Company, Dearborn, Mich.

[22] Filed: Sept. 11, 1974

[21] Appl. No.: 505,121

[52] U.S. Cl. .................. 296/1 S; 98/2.11; 105/2 A

[51] Int. Cl.² ........................ B62D 39/00

[58] Field of Search .......... 296/1 S, 91, 137 J; 105/2 R, 2 A; 224/42.1 D, 42.1 E, 42.1 R; 98/2, 2.14, 2.15, 2.16, 2.17, 2.11; 180/1 FV; D12/181

[56] References Cited

UNITED STATES PATENTS

| 2,361,924 | 3/1975 | Boynton | 296/1 S |
| 2,863,695 | 12/1958 | Stamm | 296/1 S |
| 3,328,074 | 6/1967 | Van Rossem | 296/1 S |
| 3,596,974 | 8/1971 | Adams | 296/1 S |
| 3,731,969 | 5/1973 | Bildfell | 296/1 S |
| 3,768,854 | 10/1973 | Johnson et al. | 296/1 S |
| 3,794,372 | 2/1974 | Webb | 296/1 S |
| 3,797,879 | 3/1974 | Edwards | 296/1 S |
| 3,807,787 | 4/1974 | Gotz | 296/1 S |
| 3,822,910 | 7/1974 | Wiley, Jr. | 296/1 S |

FOREIGN PATENTS OR APPLICATIONS 64,274  2/1946  Denmark ............ 296/1 S

Primary Examiner—Robert J. Spar
Assistant Examiner—Winston H. Douglas
Attorney, Agent, or Firm—Clifford L. Sadler; Keith L. Zerschling

[57] ABSTRACT

This disclosure relates to a device for reducing the wind resistance of a vehicle having a rearward body portion of greater height than a forward body portion such as a tractor-trailer rig. A false roof of generally inverted U-shape is positioned on top of the roof of the forward body portion to form an air-flow channel. An adjustable vane is positioned at the rear of the channel to direct air flowing through the channel upwardly and over the roof of the rearward body portion. The inclination of the vane is adjustable in order to accommodate rear body portions of differing height. An air conditioning unit may be positioned within the air flow channel of the false roof.

1 Claim, 2 Drawing Figures

DEVICE FOR REDUCING WIND RESISTANCE OF A VEHICLE

BACKGROUND OF THE DISCLOSURE

This disclosure relates to a means for reducing wind resistance of a motor vehicle having a rearward body portion of greater height than a forward body portion. A tractor-trailer rig where the frontal area of the trailer extends above the roof of the tractor is an example of such a vehicle. The exposed frontal surface of the trailer has high wind resistance and adversely affects the fuel economy of the vehicle when operating at highway speeds.

It is a primary object of the present invention to provide a device for reducing vehicle wind resistance that is mounted on the roof of a truck tractor and is constructed to deflect air over a trailer pulled by the tractor and away from the exposed frontal area of the trailer. The invention is also applicable to trucks having large cargo boxes that extend above the truck cab and to automobiles used in combination with travel trailers.

It is known in the art to position air deflecting devices on the cab roof of a tractor-trailer rig for reducing wind resistance. The present invention provides an improved device of this general type that is superior in performance and in its application to a variety of vehicles.

BRIEF SUMMARY OF THE DISCLOSURE

According to a preferred embodiment of the present invention, a false roof having a generally inverted U-shape is positioned on top of the roof of the cab of a tractor-trailer vehicle. The false roof, in cooperation with the regular cab roof, defines an air flow path or channel. An adjustable vane is positioned at the rear of the false roof and is inclined upwardly and rearwardly. The vane is designed to direct the air that flows through the false roof in a direction upwardly and over the roof of the trailer. According to the invention, adjustable means is provided to permit changing the angle of inclination of the vane so as to accommodate usage of the tractor with trailers of differing heights.

An air conditioning unit may be supported on the roof of the cab within the false roof. So situated, the air conditioning unit receives the full flow of air across its surface.

BRIEF DESCRIPTION OF THE DRAWINGS

The many objects and advantages of a device for reducing the wind resistance of a vehicle according to the present invention will become apparent upon consideration of the following detailed discussion and the accompanying drawings, in which.

DETAILED DESCRIPTION OF PRESENTLY PREFERRED EMBODIMENT

Figure 1:
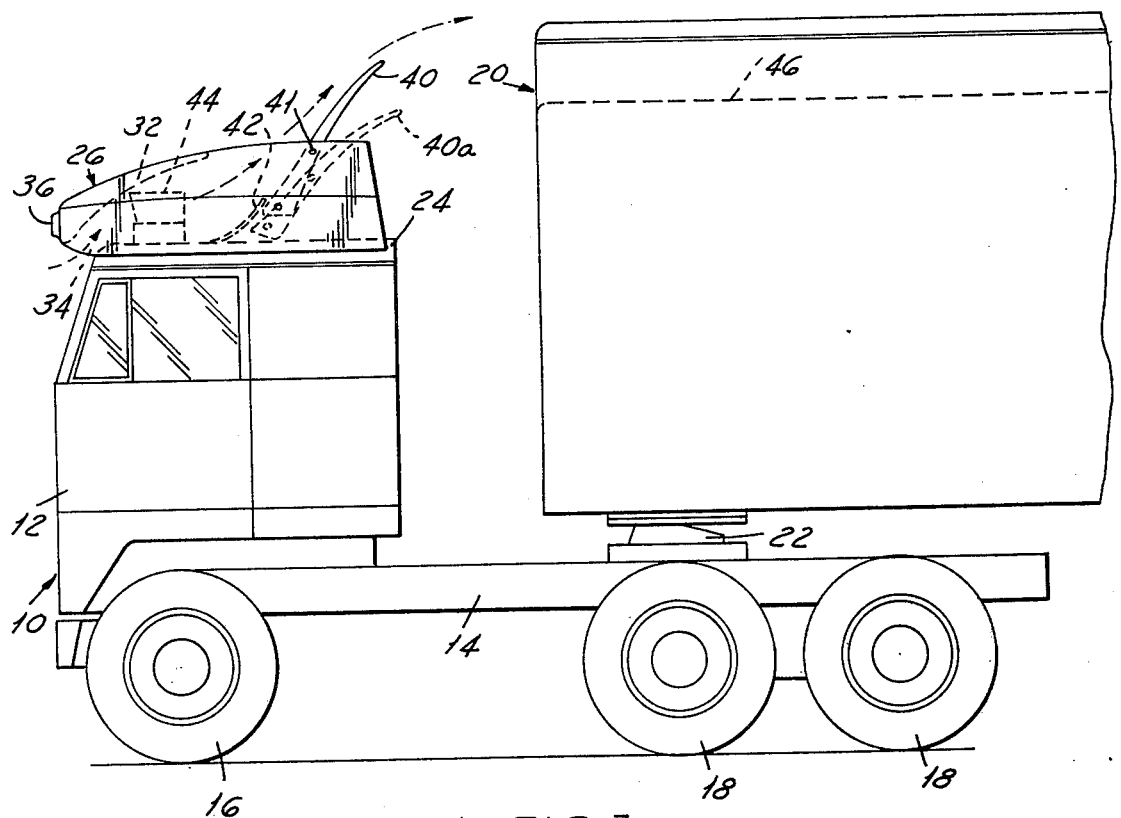
FIG. 1 is a side elevational view of a tractor-trailer vehicle having a novel device for reducing wind resistance.
Figure 2:
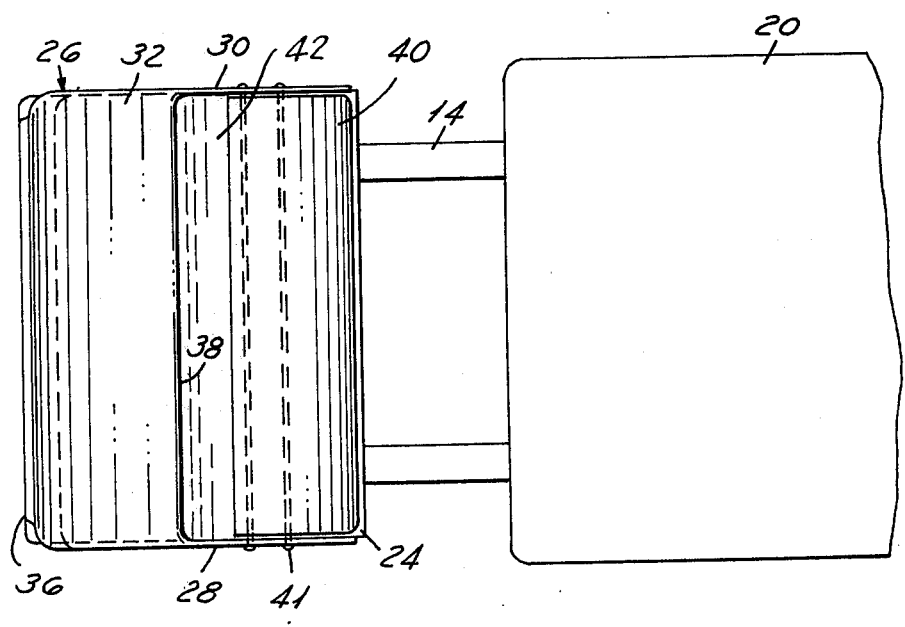
FIG. 2 is a top plan view of the vehicle of FIG. 1.

Referring now to the drawings, wherein the presently preferred embodiment of the invention is illustrated, FIG. 1 shows a tractor-trailer vehicle having a device for reducing wind resistance. The vehicle of FIG. 1 includes a tractor 10 having a cab body 12 supported on a frame 14. The frame 14 in turn is supported by front steerable wheels 16 and rear driving wheels 18. The forward portion of a semi-trailer 20 is coupled to the frame 14 of the tractor 10 by means of a fifth wheel coupling 22.

The cab 12 has a generally flat roof 24. A false roof 26 is positioned on the cab roof 24. The false roof includes generally vertical side members or panels 28 and 30 that have their lower edges attached to the lateral edges of the cab roof 24. The false roof 26 includes a transverse member 32 which extends between the side panels 28 and 30.

It will be noted from the drawing that the transverse member 32 of the false roof 26 has a leading edge situated forwardly of the leading edge 34 of the cab roof 24. A rubber strip 36 extends across the leading edge of the transverse member 32 to form a bumper.

The rearward edge 38 of the false roof panel 34 is situated just forwardly of the middle of the cab roof 24. The side panels 28 and 30 extend substantially the full length of the cab roof 24 and are, thus, of greater longitudinal length than the transverse member 32.

An adjustable air deflecting vane 40 extends across the roof 24 and has its lateral ends secured to the side panels 28 and 30 of the false roof 26. The vane 40 is connected to the side panels 28 and 30 by adjustable attachment means such as bolts 41. Manipulation of the adjustable support means 41 for the vane 40 permits the selective disposition of the vane at any one of a plurality of angles of inclination. The adjustable vane may be positioned at a maximum angle of inclination as shown by the full line position indicated by reference numeral 40 in FIG. 1 or it may be inclined at a lesser angle as indicated by the dotted line position identified by reference numeral 40a.

A fixed vane 42 extends between the side panels 28 and 30. The fixed vane 42 is inclined upwardly and rearwardly and covers the junction between the adjustable vane 40 and the roof 24. The vane 42 deflects air flowing across the cab roof 24 toward the adjustable vane 40.

An air conditioning unit 44 is mounted on the roof 24 within the enclosure defined by the side panels 28 and 30 and the transverse member 32.

OPERATION

When the vehicle of FIG. 1 is traveling forwardly at highway speeds, air will enter the opening at the forward end of the cab situated between the leading edges of the cab roof 24 and the transverse member 32 of the false roof. Air will flow between the side panels 28 and 30 and over the fixed vane 42. The fixed vane 42 will direct air flow to the adjustable vane 40 and the adjustable vane, in turn, will direct the air to flow over the trailer 20.

Without an air deflecting device, the frontal surface of the trailer 20 which extends above the roof of the cab 10 will exhibit substantial wind resistance adversely affecting the fuel economy of the vehicle. With the construction of the present invention, air flow is smoothly channeled with minimum turbulence through the interior of the false roof 26 and across the adjustable vane 40 away from the flat frontal area of the trailer 20.

The vane 40 is adjustable between the full line position 40 of FIG. 1 and the dotted line position 40a in order to accommodate trailers of differing height. The alternate position 40a would be appropriate for a semi-trailer having a roof height indicated by dotted line 46 in FIG. 1.

The elongated bolts 41 extend through aligned holes in the side panels 28 and 30 and through the transverse holes in the vane 40 whereby the vane is secured in position. When it is desired to adjust the vane to a new angle of inclination prior to using the tractor 10 in association with a trailer having a different height, the bolts 41 are first withdrawn. This permits displacement of the vane 40 from the full line position to the dotted line position of FIG. 1. The vane is then repositioned with its transverse holes in alignment with the alternate holes in the side panels 28 and 30 shown by dotted lines. With the vane 40 relocated to the new position indicated by reference numeral 40a, the bolts 41 are then inserted through the holes in the side panel 28, the vane 40 and the side panel 30 and then secured by threaded nuts in a conventional fashion. This completes the adjustment procedure.

Other features of the invention include the placement of the leading edge of the panel 32 forwardly and above the leading edge of the cab roof 24. With this construction, the false roof extends over the windshield of the cab body 12 and forms a sun visor therefor. The bumper strip 36 is positioned along the leading edge of the panel 32 in order to prevent damage to the false roof 26. With a tractor of the cab-over-engine type as shown in FIG. 1, the leading edge of the roof panel 32 extends forwardly nearly as far as the vehicles front bumper.

The condenser unit 44 of the cab air conditioning system is positioned on the roof 24 within the false roof 26. This placement has the advantage of directing air across the condenser 44 for superior operating performance. It also has the aesthetic advantage of hiding the unit.

The false roof and air deflecting device of this invention is shown in association with the cab of a tractor-trailer vehicle as an example of a preferred form of the invention. It is equally adaptable to the cab of a truck having a fixed cargo box as well as to an automobile used to pull a travel trailer.

The foregoing description presents a preferred embodiment of this invention. Details of construction are disclosed for purposes of illustration and are not to be considered limits of the invention. Modifications and alterations may occur to those skilled in the art which will come within the scope and spirit of the following claims.

I claim:
1. A device for reducing the wind resistance of a vehicle having a forward vehicle roof and a vertical body portion situated rearwardly and above said roof,
   a false roof having a transverse portion and depending side portions,
   said side portions having a greater longitudinal length than said transverse portion,
   said side portions of said false roof being joined to said vehicle roof adjacent the lateral edges of said vehicle roof,
   the leading edge of said transverse portion being spaced forwardly and upwardly of the leading edge of said vehicle roof,
   said transverse portion of said false roof being spaced apart from said vehicle roof and cooperating therewith to define an air-flow channel,
   an adjustable air deflector vane extending transversely between said side portions of said false roof,
   said adjustable vane extending upwardly and rearwardly and constructed to direct air flowing through said channel in a direction over the top of said vertical body portion,
   adjustment means supporting said adjustable vane relative to said false roof and constructed to provide means for adjusting the angle of inclination of said adjustable vane,
   said adjustable vane having an upper portion that extends upwardly above said transverse portion of said false roof whereby said adjustable vane deflects air flowing over said transverse portion as well as through said channel,
   an air conditioning unit supported on said vehicle roof in said air flow channel,
   said false roof being constructed to direct the flow of air around said air conditioning unit,
   a fixed air deflector vane extending transversely between said side portions of said false roof,
   the leading edge of said adjustable vane being disposed adjacent to and rearwardly of said fixed vane.

* * * * *